Figure 1:
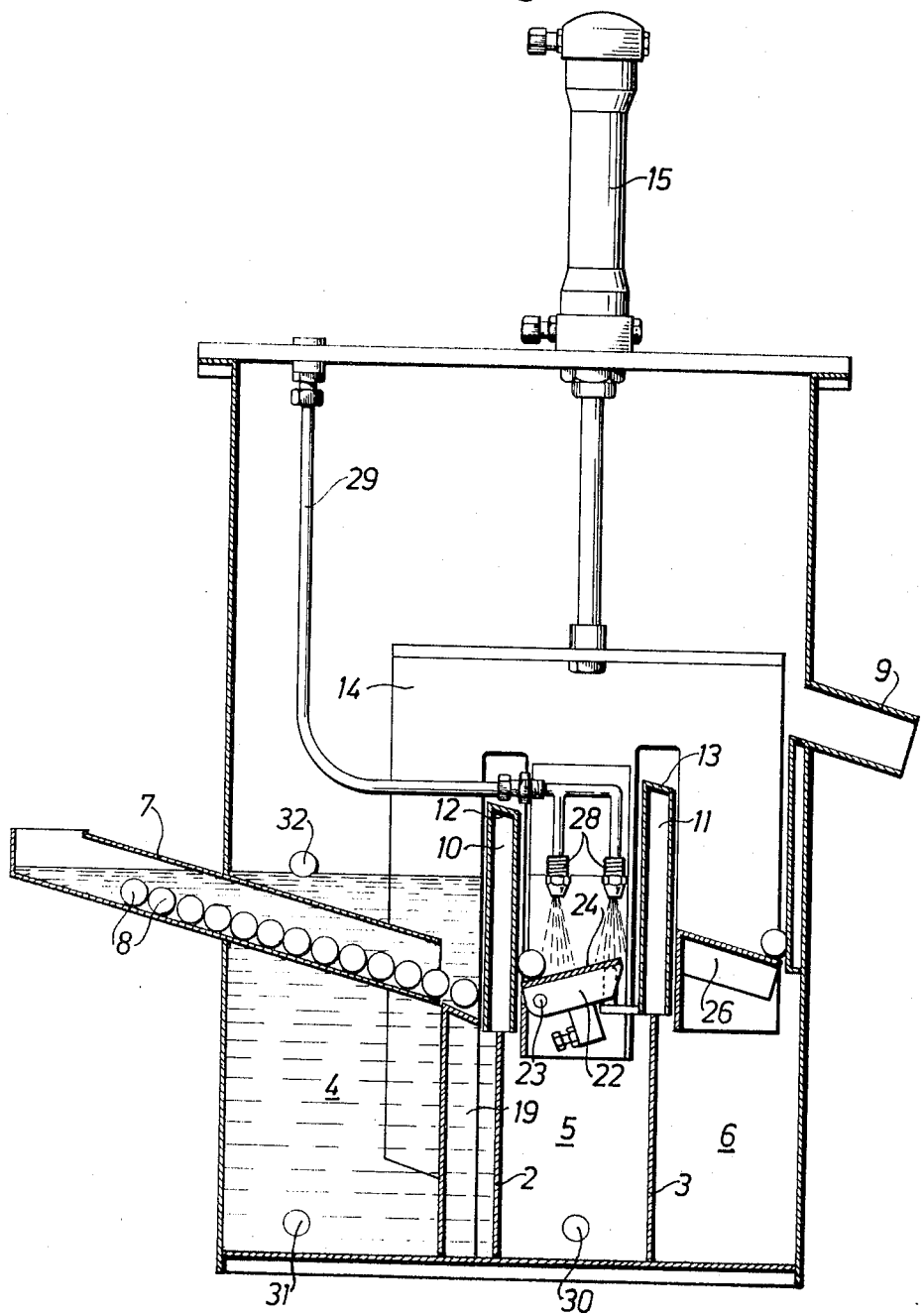

United States Patent [19] [11] 3,788,459
Holm [45] Jan. 29, 1974

[54] CONVEYOR

[75] Inventor: Kurt Anders Holm, Skoghall, Sweden

[73] Assignee: Uddeholms Aktiebolag, Uddeholm, Sweden

[22] Filed: June 16, 1972

[21] Appl. No.: 263,654

[30] Foreign Application Priority Data
July 6, 1971 Sweden.............................. 8869/71

[52] U.S. Cl. .............................................. 198/218
[51] Int. Cl. ............................................ B65g 25/04
[58] Field of Search ....... 198/19, 218, 219; 221/225

[56] References Cited
UNITED STATES PATENTS
3,592,335 7/1971 Meyer.............................. 198/219
FOREIGN PATENTS OR APPLICATIONS
252,919 9/1969 U.S.S.R.............................. 198/219

Primary Examiner—Edward A. Sroka
Attorney, Agent, or Firm—Ralph E. Parker et al.

[57] ABSTRACT

A conveyor is conveying ballbearing balls or the like without mutual contact through an apparatus for surface treatment as degreasing of the balls wtih a solvent. The conveyor comprises several stationary and movable support members, the latter being arranged between the stationary members and each member having surface which is inclining downwardly in the direction of transport. At least one of the movable support members is pivotably mounted so that its surface can alter its inclination to incline upwardly in the direction of transport. Spray guns are spraying solvent over a ball, which is rolling back and forth on the surface of the pivotably mounted member and the ball is thus treated on all sides.

6 Claims, 2 Drawing Figures

CONVEYOR

The present invention relates to a conveyor arranged to convey objects without mutual contact through an apparatus for surface treatment, e.g. for degreasing objects with a chlorinated hydrocarbon. The conveyor is particularly intended for objects having a surface which has been polished to a high degree of uniformity and where a collision between two or more objects might destroy the surface finish.

The conveyor system according to the invention comprises a feeding in part and a feeding out part for the objects, a plurality of stationary support members for the objects, located between the feeding in and feeding out parts, these stationary support members having a surface which is downwardly inclined in the direction of transport, movable support members for the objects, located between the stationary support members, these movable support members having a surface which is downwardly inclined in the direction of transport and at least one of the movable support members being pivotably mounted so that the inclination of its upper surface can be altered to incline upwardly in the direction of transport, and members to move the movable support members in vertical direction at least between two positions, namely a first position in which the movable support member is close to the nearest preceding stationary support member so that an object on the stationary support member is moved by its own weight to the movable support member, and a second position in which the movable support member is close to the next following stationary support member so that an object on the movable support member is moved by its own weight on to the stationary support member.

In a conveyor according to the invention objects can be transported in horizontal direction or forwardly-upwardly or forwardly-downwardly. The movable support members may be arranged to move only as much as is necessary to transfer an object from a preceding to a subsequent stationary support member. Alternatively, the movable support members may be arranged to move further, for example to move further down than would be necessary merely from the transport port of view. With the help of such a conveyor objects can be passed down into a series of containers arranged side by side, for example.

The invention will be further explained in the following with reference to the accompanying drawings which show a conveyor according to the invention fitted in an apparatus for degreasing spherical objects. The two figures show the movable support members in two different positions.

The apparatus illustrated comprises a container 1, the lower part of which is divided by partition walls 2, 3 into three compartments 4, 5, 6. Spherical objects 8 are fed in to compartment 4 through a feeding in means in the form of an inclined channel 7. The objects are fed out from compartment 6 along an inclined feeding out pipe 9.

The objects 8 are in practice consisting of ballbearing balls or rollerbearing rollers.

The upper part of the partition walls 2, 3 is constructed as a stationary support member 10, 11 having a thickness slightly greater than the diameter of the objects 8. The upper surface 12, 13 of these stationary support members inclines downwardly in the direction of transport.

Figure 2:
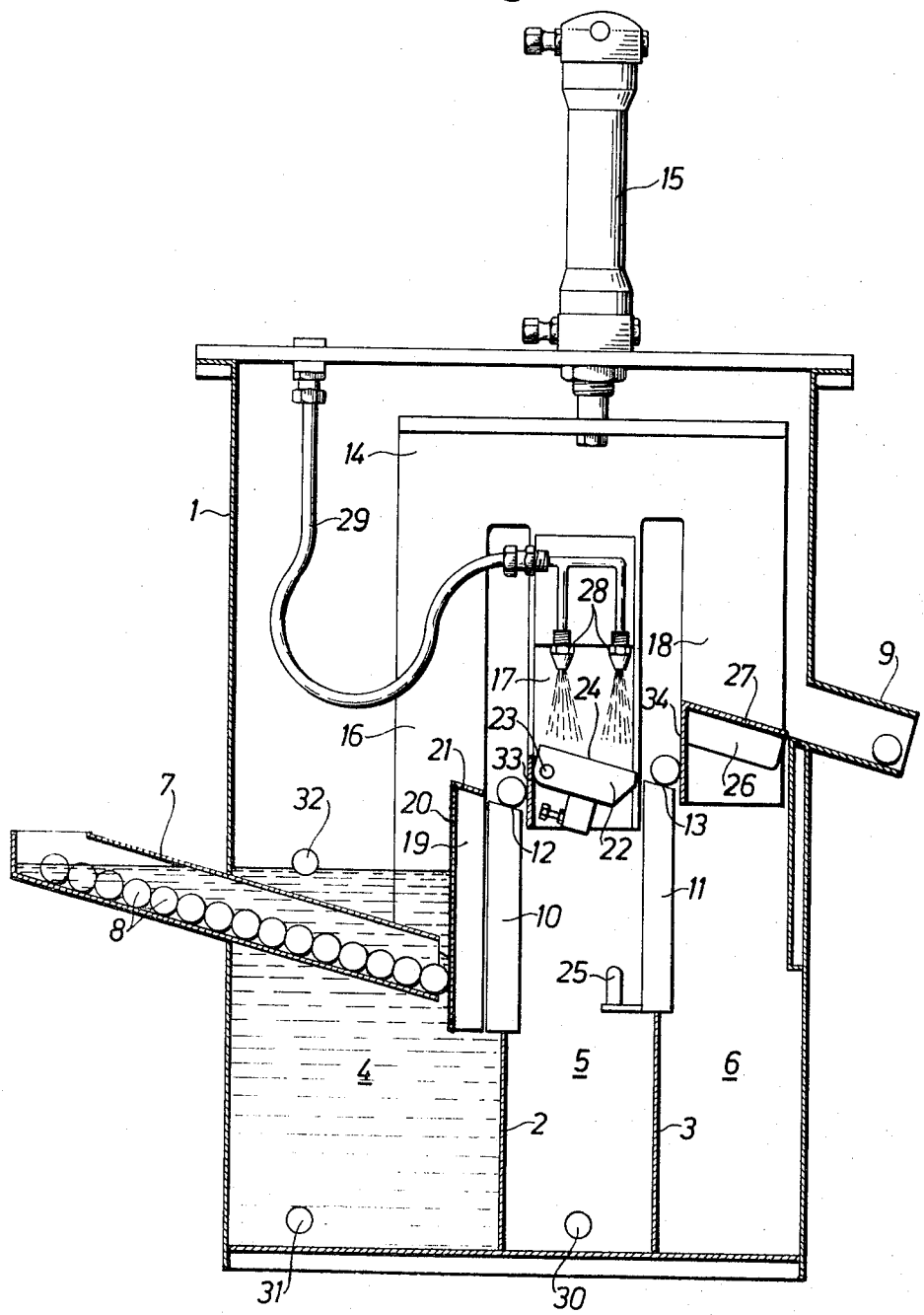

The container 1 also includes an operating member 14 which, with the help of a hydraulic device 15, can be moved between a lowest position according to FIG. 1 and a highest position according to FIG. 2. The operating member 14 has three vertical sections 16, 17, 18 which, in the position according to FIG. 1, are in the compartments 4, 5 and 6. The section 16 carries a support member 19 which is located between the end of the feeding in channel 7 and the stationary support member 10 and which has an upper surface 21 which is inclined in the direction of transport. The section 17 carries a support member 22 which can turn about a horizontal shaft pin 23. In the position according to FIG. 2, the upper surface 24 of the support member is inclined downwardly in the direction of transport. In the position according to FIG. 1 the movable end of the support member 22 has been lifted up by a stationary pin 25 (seen best in FIG. 2) so that the upper surface 24 is inclined upwardly in the direction of transport. The section 18 carries a support member 26, the upper surface 27 of which inclines downwardly in the direction of transport.

The section 17 also carries two spray nozzles 28 through which a clean chlorinated hydrocarbon, such as trichloroethylene or perchloroethylene, can be sprayed down towards the upper surface 24 of the support member 22. The solvent is supplied through a tube 29. The solvent leaves the bottom of compartment 5 through an opening 30 and is led through a tube, not shown, to compartment 4 into which it enters through an opening 31. The solvent leaves compartment 4 through an opening 32 which defines the liquid surface, this being lower than the end of the feeding in channel 7.

The apparatus functions in the following manner: The spherical objects 8 in the feeding in channel 7 come into contact with the solvent in compartment 4, a first degreasing thus being effected. When the operating member 14 moves up, the support member 19 lifts an object 8 to the level of the upper surface 12 of the stationary support member 10 so that the object rolls over on to the surface 12 and is stopped by a vertical wall 33 of the section 17. When the operating member 14 then moves down, the object will roll over on to the upper surface 24 of the solvent member 22 where it is sprayed with clean solvent. The support member 22 tips over to the position shown in FIG. 1 and then returns to the position according to FIG. 2 and the object will therefore roll to and fro on the support member 22, thus being sprayed from all sides. When the support member 22 has again assumed the position shown in FIG. 2, the object will roll over on to the upper surface 13 of the stationary support member 11, where it is stopped by a vertical wall 34 on the section 18. When the operating member 14 then moves down, the object will roll over on to the support member 26 where it will remain during the upward and downward movement of this support member so that the solvent has time to evaporate. When the support member 26 has again assumed the position according to FIG. 2, the clean and dry object will roll out into the feeding out tube 9.

The surfaces in the apparatus which come into contact with the objects are suitably covered with a plastic which is resistant to the solvent or some other soft material which will not damage the surface of the objects.

The unclean solvent from compartment 4 is led to a distilling apparatus, from where the clean solvent is returned to the nozzle 28.

What is claimed is:

1. Conveyor arranged to convey objects without mutual contact through an apparatus for surface treatment which comprises a feeding-in part (7) and a feeding-out part (9) for objects undergoing treatment;

a plurality of stationary support members (10,11) for such objects located between the feeding-in and feeding-out parts, each of these stationary support members having an upper surface (12,13) which is downwardly inclined in the direction of transport;

movable support members (19,22,26), for such objects, located between the stationary support members and arranged on a common operating member (14) which common operating member is connected to a drive means (15) for upward and downward movement, each of said movable support members (19,22,26) having an upper surface which is downwardly inclined in the direction of transport, and at least one of the movable support members (22) being pivotably mounted so that the inclination of its upper surface (24) can be altered to incline upwardly in the direction of transport by means of a projection (25) which is arranged to alter the inclination of the movable support member (22) when the support member (22) is in its lowest position; and members (14,15) to move the movable support members (19,22,26) in vertical direction, at least between two positions, namely a first position in which the movable support member (19,22,26) is close to the nearest preceding stationary support member (10,11) so that an object on the stationary support member is moved by its own weight to the movable support member, and a second position in which the movable support member (19,22,26) is close to the next following stationary support member (10,11) so that an object on the movable support member is moved by its own weight on to the stationary support member.

2. Conveyor according to claim 1, wherein the stationary support members (10,11) constitute parts of partition walls (2,3) which divide the apparatus into compartments (4,5,6) for different stages in the surface treatment, such as degreasing with liquid or vaporized solvent, or drying.

3. Conveyor arranged to convey objects without mutual contact through an apparatus for surface treatment, comprising a feeding-in part (7) and a feeding-out part (9) for objects;

a plurality of stationary support member (10,11) for such objects, located between the feeding-in and feeding-out parts, these stationary support members each having a surface (12,13) which is downwardly inclined in the direction of transport;

movable support members (19,22,26) for such objects, located between the stationary support members, each of these movable support members (19,22,26) having a surface which is downwardly inclined in the direction of transport, and at least one of the movable support members (22) being pivotably mounted;

means (25) for altering the inclination of said movable support member, so that its upper surface (24) can be altered to incline upwardly in the direction of transport; and members (14,15) to move the movable support members (19,22,26) in vertical direction, at least between two positions, namely a first position in which the movable support member (19,22,26) is close to the nearest preceding stationary support member (10,11) so that an object on the statonary support member is moved by its own weight to the movable support member, and a second position in which the movable support member (19,22,26) is close to the next following stationary support member (10,11) so that an object on the movable support member is moved by its own weight on to the stationary support member.

4. Conveyor according to claim 3, wherein the movable support members (19,22,26) are arranged on a common operating member (14) which is connected to a drive means (15) for upward and downward movement.

5. Conveyor according to claim 3, wherein said inclination-altering means comprises a projection (25).

6. Conveyor according to claim 3, wherein the stationary support members (10,11) constitute parts of partition walls (2,3) which divide the apparatus into compartments (4,5,6) for different stages in the surface treatment, such as degreasing with liquid or vaporized solvent, or drying.

* * * * *